Feb. 14, 1950 W. M. GRIGSBY 2,497,600

HOIST DEVICE

Filed May 21, 1945 5 Sheets-Sheet 1

Inventor

WILLIAM M. GRIGSBY,

By Almon S. Nelson

Attorney

Feb. 14, 1950 W. M. GRIGSBY 2,497,600

HOIST DEVICE

Filed May 21, 1945 5 Sheets-Sheet 2

Inventor

WILLIAM M. GRIGSBY,

By Almon S. Nelson

Attorney

Feb. 14, 1950 W. M. GRIGSBY 2,497,600

HOIST DEVICE

Filed May 21, 1945 5 Sheets-Sheet 3

Inventor

WILLIAM M. GRIGSBY,

By Almon S. Nelson

Attorney

Feb. 14, 1950

W. M. GRIGSBY 2,497,600

HOIST DEVICE

Filed May 21, 1945

5 Sheets-Sheet 4

Inventor

WILLIAM M. GRIGSBY,

By Almon S. Nelson

Attorney

Feb. 14, 1950 W. M. GRIGSBY 2,497,600

HOIST DEVICE

Filed May 21, 1945 5 Sheets-Sheet 5

Inventor

WILLIAM M. GRIGSBY,

By Almon S. Nelson

Attorney.

Patented Feb. 14, 1950 2,497,600

UNITED STATES PATENT OFFICE 2,497,600

HOIST DEVICE

William M. Grigsby, Richmond, Va.

Application May 21, 1945, Serial No. 594,992

15 Claims. (Cl. 294—116)

This invention relating as indicated to a hoist device is more particularly directed to that part of the hoist which engages or grips the object to be moved. There are, of course, many types of hoist devices but the present construction involves primarily a beam to which gripping jaws are pivotally attached, there being a rod extending vertically through the beam which is so connected at its lower end to the gripping jaws as to exert pressure upon the object being moved upon upward movement of a hoist line which is attached to the rod.

It is a particular object of the invention to provide manually controlled means for opening the gripping jaws so as to encompass the object being moved with a minimum of effort. This is particularly advantageous in heavy constructions adapted to move cumbersome, weighty objects.

It is a detailed object of the invention to provide means that prevent undue outward movement of the gripping jaws.

It is another object of the invention to provide means upon the lower ends of the gripping jaws so that the device can be readily moved and also in order to avoid any damage to the mechanism should the same be accidently dropped to the floor, deck or other surface upon which the object to be moved rests.

A still further object of the invention is to provide a multiplicity of gripping shoes which are interchangeable so that any desired pair can be used in association with the gripping jaws to engage and grip an object of any contour. For example, it is an object to provide shoes which will engage the reinforcing ribs on a conventional oil barrel, these shoes being interchangeable with other shoes which will grip flat surfaced objects, such as boxes. Still other forms of shoes have been provided to engage objects of tapering, cylindrical formation or objects of irregular contour, such as large stones and the like. Stated briefly, it is an object of the invention to provide means to grip and lift metal drums, concave wooden barrels, boxes, pipe, stones and the like.

A detailed object of the invention is to provide a gripping shoe with means so that the same will slide downwardly and over an object to be moved without damage to the object, particularly in the case of rolls of paper and the like.

A very important and broad object of the invention is to provide means to gently lower the gripping device over the object to be moved, such means being associated with other means to move the gripping jaws outwardly a distance sufficient to grip the object to be moved.

A specific object of the invention is to provide a hand wheel which controls the opening movement of the gripping jaws.

A further specific object of the invention is to provide a hoist gripper with a quick release means which can be employed where the goods moved are of the type that they can be dropped without injury to the same. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principal of the invention may be used.

Figure 7:
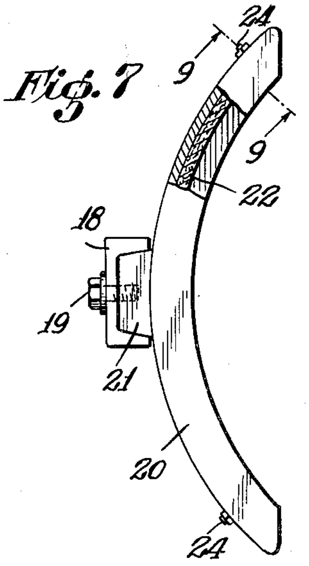
Fig. 7 is a side elevation of Fig. 8.
Figures 9, 10, 12, 13, 14:
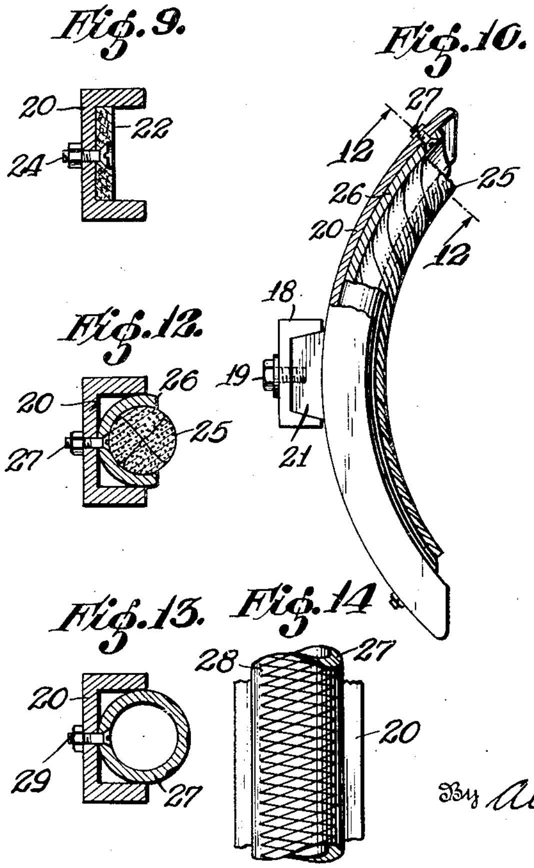
Fig. 9 is a section on line 9—9 of Fig. 7.
Figure 11:
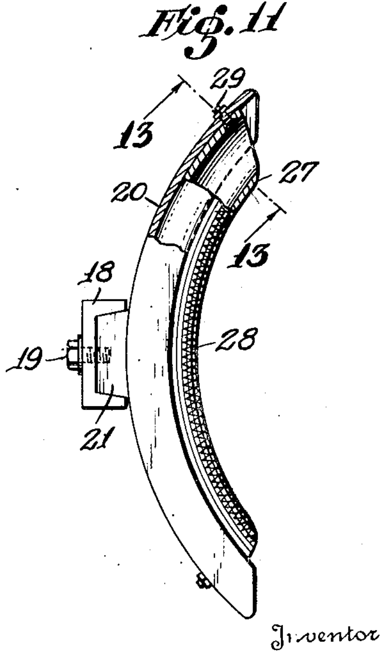
Figures 15, 16, 17, 18:
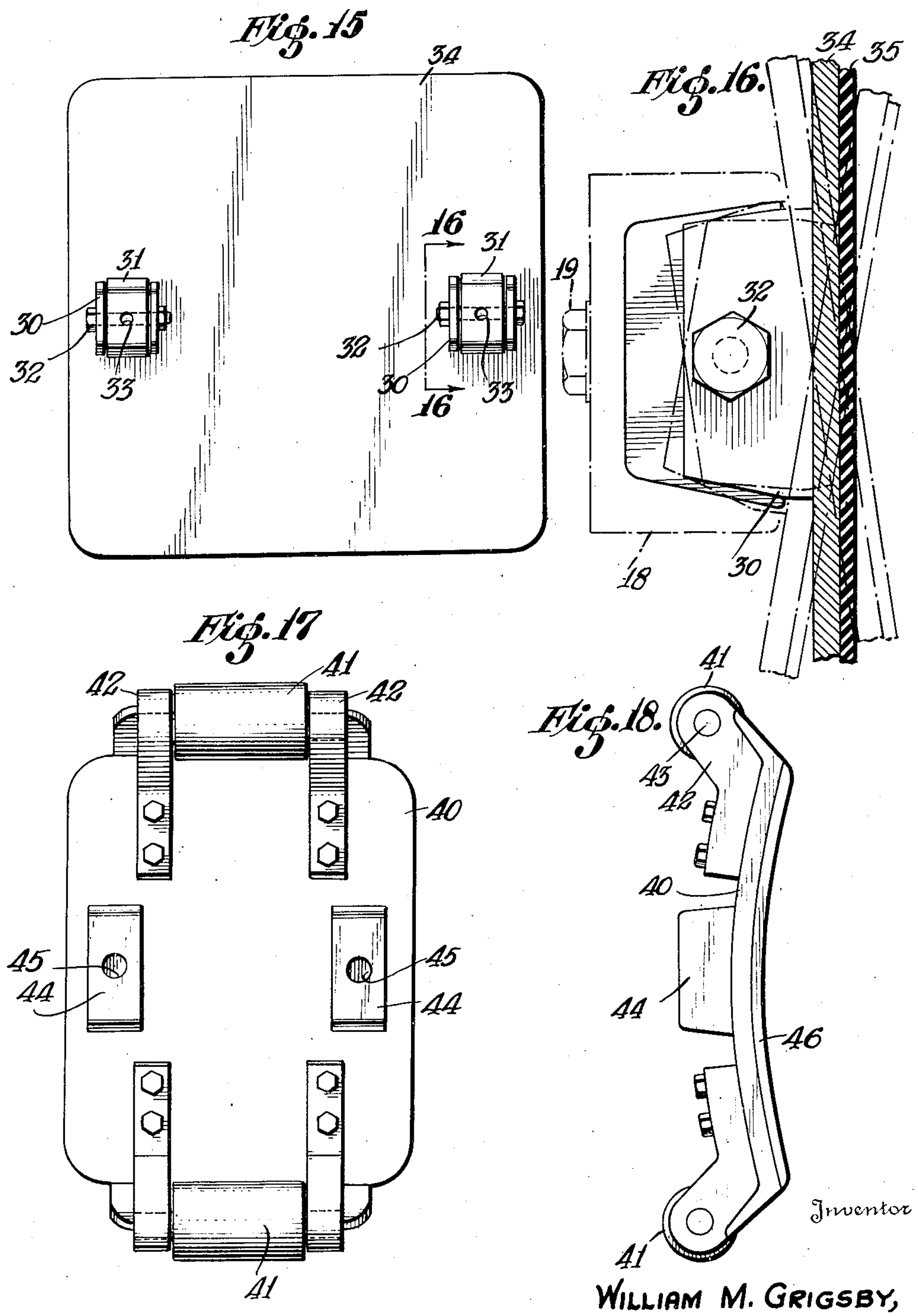

Fig. 10 is a side elevation similar to Fig. 7 of a modified form of gripping shoe, Fig. 11 is a side elevation similar to Fig. 7, of a still further modified form of the gripping shoe, Fig. 12 is a section on line 12—12 of Fig. 10, Fig. 13 is a section on line 13—13 of Fig. 11, Fig. 14 is a partial front elevation of Fig. 11, Fig. 15 is a rear elevation of still another form of gripping shoe, Fig. 16 is a side elevation of Fig. 15, Fig. 17 is a rear elevation of another form of gripping shoe, and Fig. 18 is a side elevation of Fig. 17.

Figure 1:
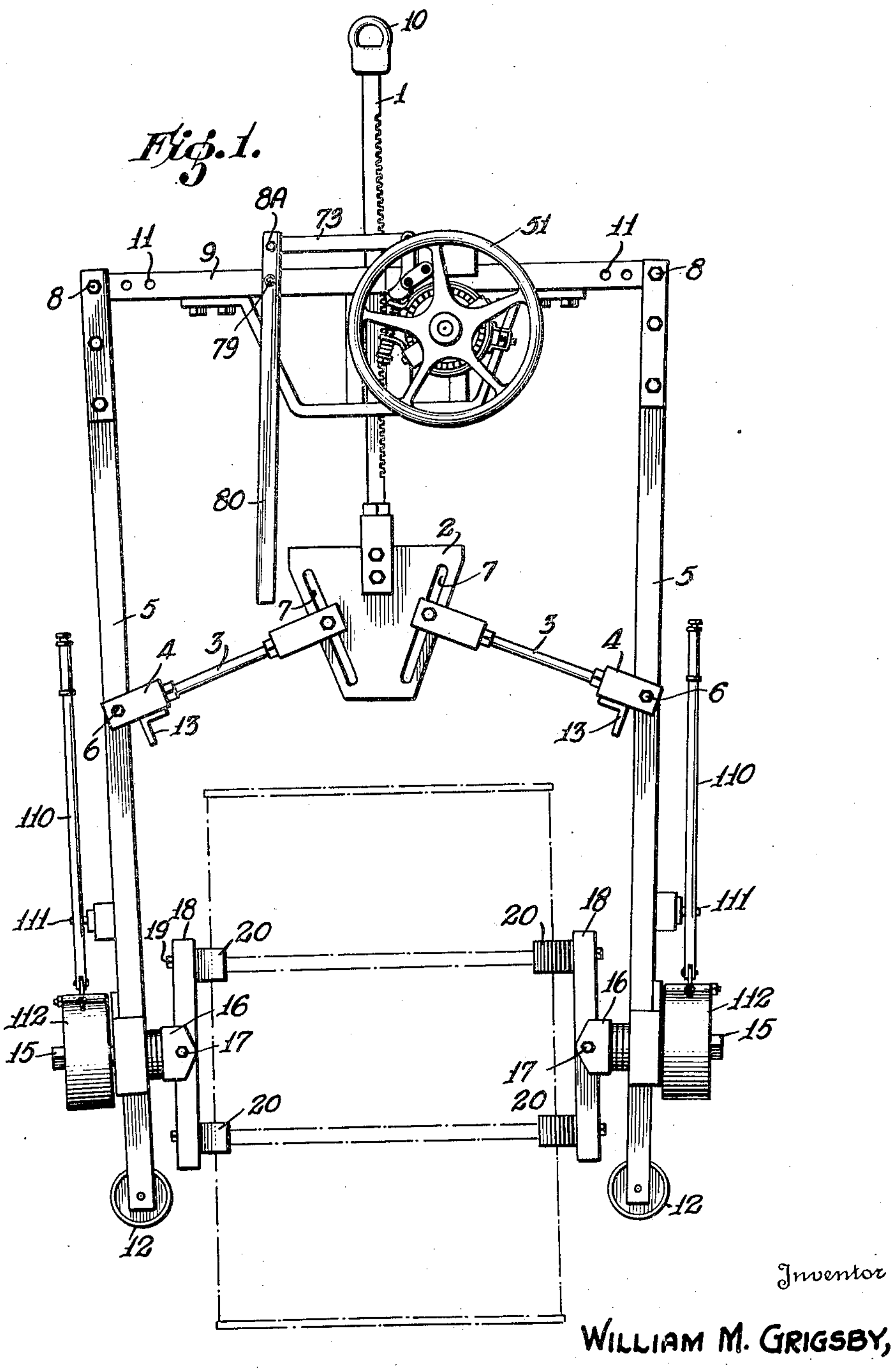
Fig. 1 is a front elevation.

Referring now to the drawings, and more particularly Fig. 1, it will be seen that I have provided a hoist device which comprises a hoist rod 1 having a lifting ring 10 secured to its upper end and a coupling plate 2 secured to its lower end, a pair of links 3—3 provided at their adjacent ends with bolts slidable in guide slides 7—7, in the coupling plate 2. Clevises 4 are secured to the opposite ends of the connecting links 3, these clevises being pivoted by means of bolts 6 which extend through the gripping jaws 5. The gripping jaws are pivoted by means of bolts 8 to a horizontally extending beam 9, this beam being provided with a multiplicity of holes 11 so that the gripping jaws may be used with objects of various dimensions.

The construction thus far described is similar to that shown in my prior patent, 2,364,897, granted December 12, 1944. In both constructions, upward movement of the hoist rod 1, which is designed to be attached to a hoist line by means of the ring 10, causes inward movement of the gripping jaws so as to engage the objects to be lifted. The principal difference between the present device and that of my prior patent resides in the mounting of the gripping shoes, the variety of forms of gripping shoes and hand wheel and brake, which provide means to control the gripping jaws, as well as to quickly release the load when desired.

Figure 8:
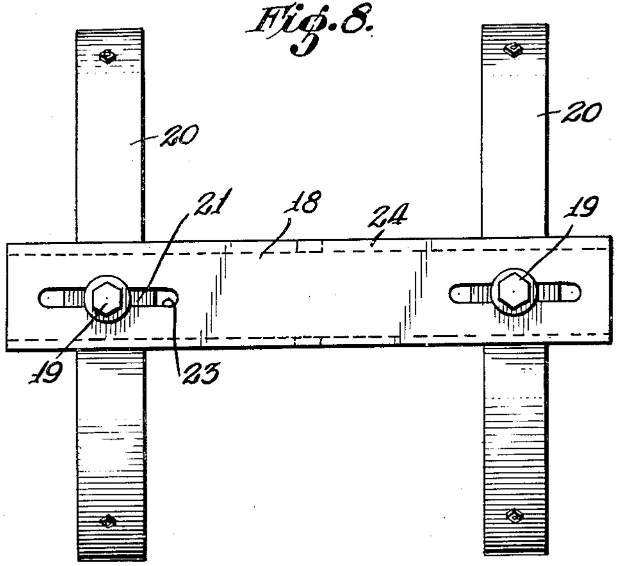
Fig. 8 is a rear elevation of Fig. 7, showing one form of gripping shoe.

Referring now, and more particularly to the lower portion of Fig. 1 and Figs. 7 to 14, inclusive, it will be seen that supporting shafts 15 extend through the gripping jaws and have clevises 16 secured at the inner ends of such shafts. This permits a gripping jaw assembly, as shown in Fig. 8, to rotate around a horizontal axis, thus permitting an object to be placed upon its ends or upon a side portion thereof. In addition to the horizontal rotation, the channel bars 18 are mounted so as to swivel about the supporting bolts 17 in the clevises 16. This construction has a dual function in that the channel bars and consequently, the gripping shoes 20—20, for example, may be positioned in a true vertical plane, regardless of the plane in which its associated gripping jaws 5 extends. In Fig. 1, for instance, it will be noted that the gripping jaws extend inwardly, whereas the channel bar 18 extends in a true vertical plane. This makes it possible to grip a barrel or other object in two places with a single gripping shoe, the gripping force or pressure being equally divided between the two shoes 20, 20, as shown in Fig. 1.

The swivel mounting upon bolts 17 has a further advantage in that tapered objects, such as those having the general contour of a frustrum of a cone, may be gripped and easily moved from one place to another.

The various forms of gripping shoes differ only in the object engaging member, that is; a common assembly is used such as that shown in Fig. 8. In Fig. 8, the channel bar 18 is provided with slots 23, through which securing bolts 19 extend, the bar 18 and bolts 19 being usable with the gripping shoes shown in section in each of Figs. 9, 12 and 13.

The particular shoe of Fig. 7 comprises a curved channel member 20 having a wedge block 21 secured to its outer rear central portion, the block having an external contour complementary to the inner contour of the channel bar 18. The blocks 21 serve to firmly connect the gripping shoes to the channl bar 18, and also provide a means to receive the connecting bolts 19. A facing 22 is secured by means of bolt 24 in the bottom of the shoe 20, this particular type being suited to grip conventional metal barrels which are usually provided with reinforcing ribs as shown diagrammatically in Fig. 1.

In Fig. 10, I have shown a gripping shoe adapted to be used with objects having tapered surfaces or corrugated surfaces or irregular surfaces. In this instance, I have provided an object engaging material in the form of heavy rope which is initially secured in the member 26, this member extending beyond the rope at its opposite ends as shown in Fig. 10, thus permitting it to be connected to the shoe 20 by some such means as bolts 27. The member 26 can be conveniently formed of pipe which has a portion thereof removed so that more than half of its circumference remains. The rope is slidably received in the member 26, after which the member 26 is bolted to the curved channel member 20.

In another form of gripping shoe, I have provided a pipe like member 27 which is roughened so as to provide a rough engaging surface 28. This member may be a pipe having its ends cut an angle so as to permit access to secure bolts 29.

The various modifications shown in Figs. 7 to 14 inclusive involve gripping shoes with interchangeable surface engaging members, so that a curved object of any configuration may be gripped and moved, after which another curved object can be moved by merely interchanging facing 22 with the shoe 26 or 27.

Referring now to the gripping member shown in Figs. 15 to 18, it will be seen that the flat gripping member 34 of Fig. 15 has attached thereto a pair of clevises 30, the clevises having received therein wedge blocks 31, these blocks being receivable in the channel bar 18. The wedge blocks 31 are supported in the clevises by means of the bolts 32, thus permitting oscillation of the flat gripper 34 with respect to the channel bar 18. Thus it is possible to engage an object having flat surfaces which may either extend in a true vertical plane or in a plant at an angle to a true vertical plane.

In Figs. 17 and 18, I have shown a curved gripper plate 40, this plate being provided with wedge blocks 44 similar to the wedge blocks 21 in Figs. 7, 8, 10 and 11. Bolts 19 are adapted to extend into screw threaded apertures 45, thus securing the curved plate 40 to the channel bar 18. This embodiment of the gripping shoe or plate is provided with means to prevent any damage to the object which is to be moved. This means comprises rollers 41 mounted at the extreme ends of plate 40, the rollers being supported upon shafts 43 extending through trunnions 42. The object engaging surface of this form of gripping plate is provided with a covering 46 which is preferably of rubber or some such resilient material so that as the device of Fig. 1 descends downwardly, the lower roller 41 will first contact the object to be moved and will cause the jaws 5 to move outwardly without damage to the object. As the device descends so as to be in position to exert a full grip the soft face 46 will slide over the object thus preventing injury. This modification is particularly adapted for use in connection with the movement of rolls of paper, corrugated boxes and other materials which may be easily damaged by careless operators dropping the device upon the object.

Referring now to Figs. 2 to 6 inclusive, it will be observed that I have provided a hand wheel 51 which is keyed to shaft 50, this shaft having a small pinion 58 keyed thereto upon the end opposite to the end upon which the hand wheel is mounted. Pinion 58 meshes with gear 59 which is keyed to shaft 105, this shaft having a pinion 106 keyed thereto which engages the ratchet on hoist rod 1. From an inspection of Fig. 6, it will be noted that as the hand wheel 51 is moved in a clockwise direction, the pinion 106 is moved in a counter-clockwise direction and assuming that the hoist rod 1 is stationary, movement will be imparted to the beam 9 causing the same to ascend the rack on hoist rod 1, which in turn causes opening movement of the gripping jaws 5.

A combined ratchet and brake drum 57 is loosely mounted upon shaft 50, this ratchet drum being provided with ratchet teeth 56 which are engaged by dogs 54, these dogs being received in cylindrical bores in opposite ends of the block 52. The block 52 is keyed to shaft 50 and moves in exact accordance with the movement of hand wheel 51. The dogs 54 are guided in their movement by means of bolts 55 which slide in recesses, these recesses being somewhat smaller than the diameter of the dogs 54 and which is sufficient to provide free movement of the guide screws 55 in pairs, which extend parallel to the axis of shaft 50 and at right angles to the longitudinal axis of block 52. A leaf spring 81 is secured at its central portion to the block 52, this spring being free at its outermost ends, thus pressing the dogs 54 into engagement with the ratchet teeth at all times.

Figure 5:
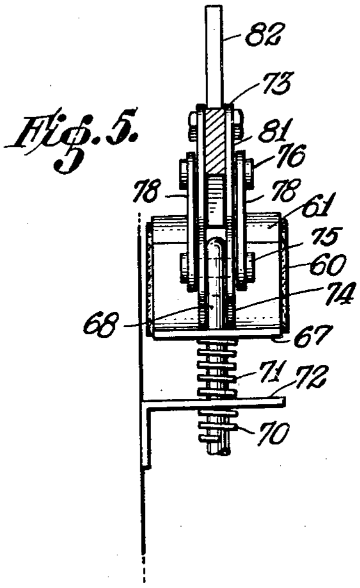
Fig. 5 is a partial sectional view taken on line 5—5 of Fig. 2.
Figure 6:
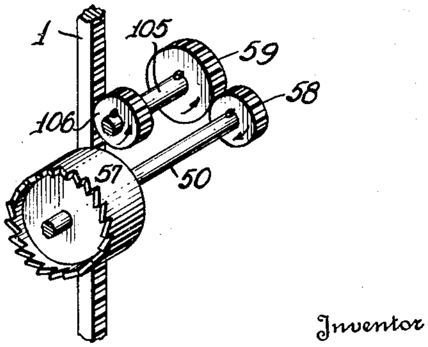
Fig. 6 is a detailed view of the gearing train.

A brake mechanism is mounted in association with the drum 57 so as to secure this drum in any desired position, thus preventing movement of the shaft 50 in one direction, movement in the other direction being permitted by means of the ratchet mechanism. A brake lining 60 is secured to the brake shoe 61, this brake shoe being mounted so that pressure may be evenly applied and evenly released throughout the circumferential surface of the drum 57. For example, it will be noted in Fig. 2 that a supporting bar 62 extends outwardly from frame member 63 and is slidably received in bracket 64, there being a compressed spring mounted upon adjusting screw 65 so that the shoe 61 is normally urged outwardly, diametrically opposite to the bar 62. The brake shoe is provided with flanges 66 and 67. These flanges are supported upon the rod 68, there being a relatively strong spring 69 normally urging the shoe to closed or engaging position. A pair of springs 70 and 71 are mounted between flanges 66 and 67, these springs being separated by bracket 72. (See Figs. 2 and 5.) The division of the springs in this manner equally divides the pressure being exerted. A member 83 provided with cam surface 74 is pivotally connected to a pair of links 78, the pivot 75 also extending through the eye of bolt 68 as shown in Fig. 5. The links 78 are pivotally connected at 76 to a fixed plate 82, this plate 82 being supported by means of bolt 100 that is attached to the upper main beam 9. The actuating link 83 is pivotally connected to the horizontally extending link 73, this link being pivoted at 84 to the operating lever 80. The operating lever 80 is pivotally connected to the cross beam 9 by means of bolt 79. Thus it will be seen from an inspection of Figs. 1 and 2 that movement to the right of the operating lever as viewed in Fig. 1 will cause the link 73 to move to the left as shown in Fig. 2, thus bringing cam surface 74 into engagement with brake shoe flange 67 which causes application of the brake to the drum 57.

In operation, the device is lowered to a position immediately over the object to be moved and then the operator releases the brake gradually by a short gentle movement of the lever 80. This causes descent of the device shown in Fig. 1 except for the hoist rod 1 which is attached to the hoist line and remains in a fixed position. As the device and particularly the gripping jaws closely approach the object, the operator then applies the brake by moving brake lever 80 to the right, thus clamping the brake drum and preventing counter-clockwise movement of the hand wheel 51 and shaft 50. The operator next moves the hand wheel in a clockwise direction, this causing the beam 9 and the dependent parts to ascend the rack on hoist rod 1 which in turn causes opening movement of the jaws 5. When the jaws have been moved slightly beyond the confines of the object to be lifted, the brake is gently released and the jaws descend to a desirable gripping location. It is merely necessary now to release the brake and pull upwardly on the hoist rod 1 since the shoes will readily grip the object firmly and securely.

Figures 2, 3:
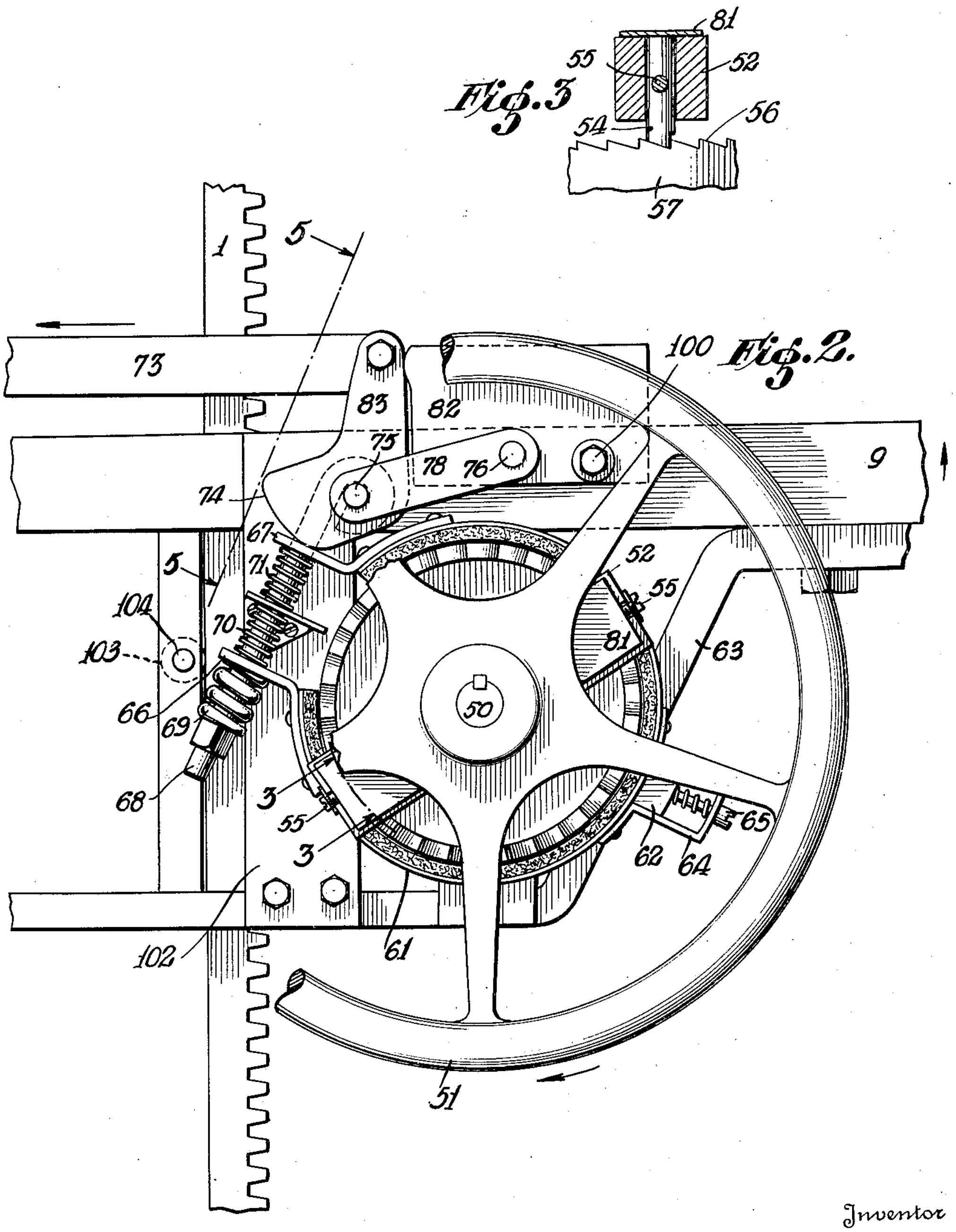
Fig. 2 is an enlarged partial elevation of Fig. 1.
Fig. 3 is a section taken on line 3—3 of Fig. 2.
Figure 4:
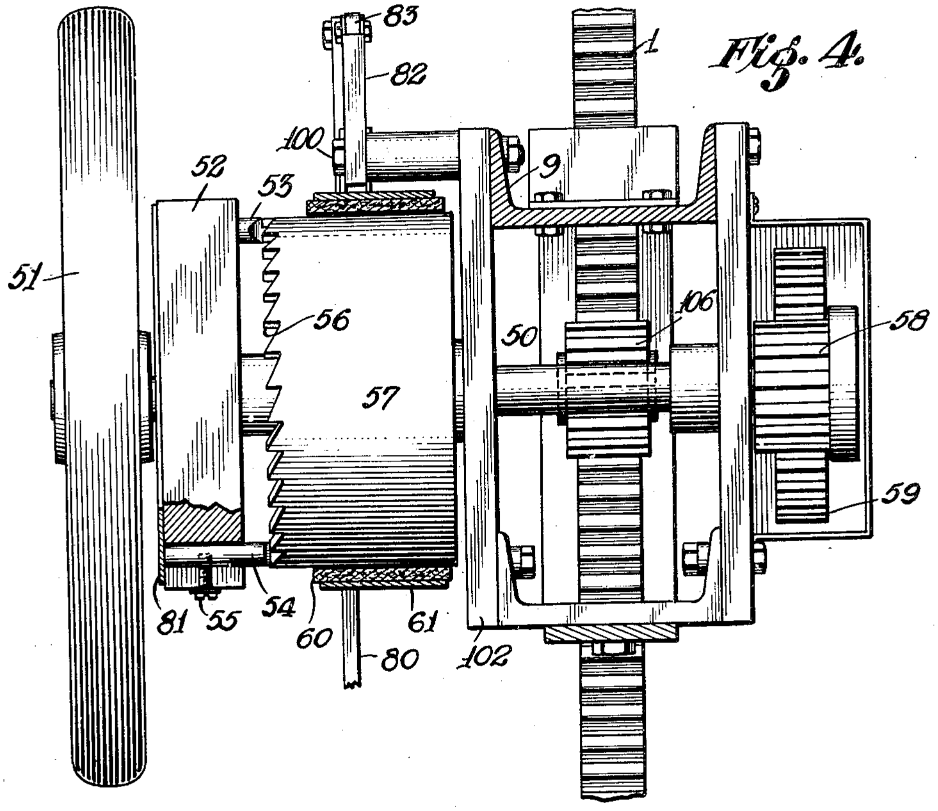
Fig. 4 is a central vertical section of Fig. 2.

In order to guide the hoist rod 1 and prevent wear, I have provided a roller 103 mounted on shaft 104 as shown in Fig. 2.

Referring now to Fig. 1, it will be seen that each of the gripping jaws 5 has associated therewith a brake mechanism so that the object being moved can be maintained in any desired position since the same is movable about the axis of the shaft 15. The brake lever 110 is similar to an emergency brake lever being pivoted at 111, to its gripping jaws 5 and being connected at its lower end to an external brake shoe 112. The object is rotated to a desired position and then both brakes are set which will maintain the object in such position.

It is desired to call attention to a modification not shown which would be useful in devices of the type shown in Fig. 1 where the same is of greatly increased proportions. For example, if the hand wheel 51 and brake lever 80 are out of reach of the operator, the lever 80 could be replaced by a cable actuated member pivoted at 79 and having two diverging arms, the extremities of which are provided with depending control cables. In this case, the hand wheel 51 would be replaced by a cable operated wheel somewhat similar to a chain hoist.

In conclusion, it will be seen that I have provided a hoisting device, usually termed a hoist grapple, which will convey smooth boxes that have either flat or tapered surfaces, wooden barrels which normally have longitudinal convex surfaces, objects with corrugated surfaces or oil drums that are normally provided with reinforcing ribs. It will be noted that it is merely necessary to change from one pair of shoes to another and that the change involves the loosening and making up of four bolts. In addition, it will be seen that the shoes are adjustable on their supports so as to efficiently grip a wide variety of objects to be moved. My device is capable of operation by one man and requires no great effort on his part. Furthermore, there is no danger of injury to the operator, nor of injury to the object being moved. Undue spreading of the gripping jaws 5 is prevented by the stops 13—13, and the mechanism, regardless of its size, may be easily moved about since it is provided with wheels 12—12. In actual tests, one man can very easily manipuate an oil drum, the weight of which is 459 lbs. Paper rolls having a weight of 400 lbs. and more, have also been gripped and lifted. Orientation of the article being moved so that the same can be placed in a different position is very easily accomplished.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In apparatus of the character described the combination of; a beam, gripping jaws pivotally attached thereto, a hoist rod extending through said beam, the lower end of said hoist rod being connected to said gripping jaws by means that cause said jaws to approach each other upon upward movement of said hoist rod, and other means associated with said hoist rod and beam to move said beam with respect to said rod, whereby said jaws may be opened.

2. In apparatus of the character described the combination of; a beam, gripping jaws pivotally attached thereto, a hoist rod extending through said beam, the lower end of said hoist rod being connected to said gripping jaws by means that cause said jaws to approach each other upon upward movement of said hoist rod, and other means associated with said hoist rod and beam to move said beam with respect to said rod, whereby said jaws may be opened, said last named means including a rack on said hoist rod, a train of gears and a hand wheel, one gear of said train being in mesh with said rack and said hand wheel being keyed to and movable with the gears of said train.

3. In apparatus of the character described the combination of; a beam, gripping jaws pivotally attached thereto, a hoist rod extending through said beam, the lower end of said hoist rod being connected to said gripping jaws by means that cause said jaws to approach each other upon upward movement of said hoist rod, and other means associated with said hoist rod and beam to move said beam with respect to said rod, whereby said jaws may be opened, said last named means including a rack on said hoist rod, a train of gears and a hand wheel, one gear of said train being in mesh with said rack and said hand wheel being keyed to and movable with the gears of said train, there being means present to prevent rotary movement of said hand wheel in one direction.

4. In apparatus of the character described the combination of; a beam, gripping jaws pivotally attached thereto, a hoist rod extending through said beam, the lower end of said hoist rod being connected to said gripping jaws by means that cause said jaws to approach each other upon upward movement of said hoist rod, and other means associated with said hoist rod and beam to move said beam with respect to said rod, whereby said jaws may be opened, said last named means including a rack on said hoist rod, a train of gears and a hand wheel, one gear of said train being in mesh with said rack and said hand wheel being keyed to and movable with the gears of said train, said last named means including a shaft extending transversely of said beam, said shaft having said hand wheel mounted thereon and gearing associated therewith adapted to mesh with said rack on said hoist rod.

5. In apparatus of the character described, the combination of; a beam, gripping jaws pivotally attached thereto, a hoist rod extending through said beam, the lower end of said hoist rod being connected to said gripping jaws by means that cause said jaws to approach each other upon upward movement of said hoist rod, and other means associated with said hoist rod and beam to move said beam with respect to said rod, whereby said jaws may be opened, said last named means including a rack on said hoist rod, a train of gears and a hand wheel, one gear of said train being in mesh with said rack and said hand wheel being keyed to and movable with the gears of said train, said last named means including a shaft extending transversely of said beam, said shaft having said hand wheel mounted thereon and gearing associated therewith adapted to mesh with said rack on said hoist rod, said shaft also having a drum rotatably mounted thereon, there being brake means associated with said drum.

6. In apparatus of the character described, the combination of; a beam, gripping jaws pivotally attached thereto, a hoist rod extending through said beam, the lower end of said hoist rod being connected to said gripping jaws by means that cause said jaws to approach each other upon upward movement of said hoist rod, and other means associated with said hoist rod and beam to move said beam with respect to said rod, whereby said jaws may be opened, said last named means including a rack on said hoist rod, a train of gears and a hand wheel, one gear of said train being in mesh with said rack and said hand wheel being keyed to and movable with the gears of said train, said last named means including a shaft extending transversely of said beam, said shaft having said hand wheel mounted thereon and gearing associated therewith adapted to mesh with said rack on said hoist rod, said shaft also having a drum rotatably mounted thereon, there being brake means associated with said drum, said drum being provided with ratchet teeth, said shaft having a block secured thereto with a ratchet dog mounted therein adapted to engage said ratchet teeth.

7. In apparatus of the character described, the combination of; a beam, gripping jaws pivotally attached thereto, a hoist rod extending through said beam, the lower end of said hoist rod being connected to said gripping jaws by means that cause said jaws to approach each other upon upward movement of said hoist rod, and other means associated with said hoist rod and beam to move said beam with respect to said rod, whereby said jaws may be opened, said last named means including a rack on said hoist rod, a train of gears and a hand wheel, one gear of said train being in mesh with said rack and said hand wheel being keyed to and movable with the gears of said train, said last named means including a shaft extending transversely of said beam, said shaft having said hand wheel mounted thereon and gearing associated therewith adapted to mesh with said rack on said hoist rod, said shaft also having a drum rotatably mounted thereon, there being brake means associated with said drum, a brake lever connected to said brake means, said lever being mounted adjacent said hand wheel whereby an operator may control said lever and wheel simultaneously.

8. In apparatus of the character described, the combination of; a beam, gripping jaws pivotally attached thereto, a hoist rod extending through said beam, the lower end of said hoist rod being connected to said gripping jaws by means that cause said jaws to approach each other upon upward movement of said hoist rod, a clevis rotatably mounted in each of said gripping jaws, a bar swivelled to each said clevis, a plate with a layer of gripping material mounted on the front face thereof and securing means mounted on the rear face thereof secured to each said bar, said securing means including a clevis with its base secured to said rear face and a wedge block, said clevis of said securing means being oscillated supported on a bolt extending through the legs thereof and said wedge block.

9. In apparatus of the character described, the combination of; a beam, gripping jaws pivotally attached thereto, a hoist rod extending through said beam, the lower end of said hoist rod being connected to said gripping jaws by means that cause said jaws to approach each other upon upward movement of said hoist rod, a curved plate having a layer of gripping material secured to its front face and rollers mounted at opposite ends, said rollers having axes that are spaced rearwardly of said plate.

10. The structure set forth in claim 1 wherein said gripping jaws are provided with gripping shoes.

11. The structure set forth in claim 1, wherein said gripping jaws are provided with gripping shoes, each of said gripping shoes comprising a plate, gripping means mounted on the front face of said plate and securing means mounted on the rear face thereof.

12. The structure set forth in claim 1, wherein said gripping jaws are provided with gripping shoes, each of said shoes comprising a curved channel member having mounted therein a support that is curved similar to the channel member and which in cross section comprises a segment of a circle with a rope-like filler retained in said support.

13. The structure set forth in claim 1, wherein said gripping jaws are provided with gripping shoes, each of said gripping shoes comprising a plate, a layer of gripping material mounted on the front face of said plate and securing means mounted on the rear face thereof.

14. The structure set forth in claim 1, wherein said gripping jaws are provided with gripping shoes, each of said gripping shoes comprising a plate with a layer of gripping material mounted on the front face thereof and securing means mounted on the rear face, said securing means including a clevis with its base secured to said rear face and a wedge block, said clevis being oscillatory supported on a bolt extending through the legs of said clevis and said wedge block.

15. The structure set forth in claim 1, wherein said gripping jaws are provided with gripping shoes, each of said shoes comprising a plate having a layer of gripping material secured to its front face and rollers mounted at opposite ends, said rollers having axes that are spaced rearwardly of said plate.

WILLIAM M. GRIGSBY.

REFERENCES CITED

The following references are of record in the file of this patent:

UNITED STATES PATENTS

| Number | Name | Date |
|---|---|---|
| 246,632 | Palmer | Sept. 6, 1881 |
| 729,939 | Jones | June 2, 1903 |
| 1,731,674 | Lutz | Oct. 15, 1929 |
| 1,733,084 | Schmidt et al. | Oct. 22, 1929 |
| 2,274,918 | Chenette | Mar. 3, 1942 |
| 2,364,897 | Grigsby | Dec. 12, 1944 |